United States Patent [19]

Holtmann

[11] Patent Number: 5,268,159

[45] Date of Patent: Dec. 7, 1993

[54] PROCESS FOR THE PRODUCTION OF STORABLE, FREE-FLOWING HYDRATED FERROUS SULFATE

[75] Inventor: Udo Holtmann, Krefeld, Fed. Rep. of Germany

[73] Assignee: Bayer Aktiengesellschaft, Leverkusen, Fed. Rep. of Germany

[21] Appl. No.: 905,175

[22] Filed: Jun. 24, 1992

Related U.S. Application Data

[63] Continuation of Ser. No. 644,791, Jan. 23, 1991, abandoned.

[30] Foreign Application Priority Data

Jan. 30, 1990 [DE] Fed. Rep. of Germany ....... 4002608

[51] Int. Cl.$^5$ .............................................. C01G 49/14
[52] U.S. Cl. ..................................... 423/558; 423/138
[58] Field of Search ............... 423/138, 142, 146, 154, 423/576.5, 558, 267; 23/313 R, 305 F; 71/63, 64.01, 64.12

[56] References Cited

U.S. PATENT DOCUMENTS

| | | | |
|---|---|---|---|
| 1,640,026 | 12/1899 | Ramage | 423/146 |
| 2,429,759 | 10/1947 | Hopton | 423/231 |
| 2,771,342 | 11/1956 | Lamanna | 423/150 |
| 4,401,636 | 8/1983 | Flowers | 423/327 |

FOREIGN PATENT DOCUMENTS

| | | |
|---|---|---|
| 0054314 | 6/1982 | European Pat. Off. . |
| 0168308 | 12/1984 | European Pat. Off. . |
| 0321747 | 11/1988 | European Pat. Off. . |
| 67528 | 12/1984 | Finland . |
| 2407203 | 8/1975 | Netherlands . |
| 365981 | 1/1932 | United Kingdom . |
| WO84/01942 | 5/1984 | World Int. Prop. O. . |

OTHER PUBLICATIONS

Chemical Abstracts, vol. 83, No. 6, (Aug. 11, 1975) p. 116.

Translation of a part of Japanese Patent Appln. Laid-Open Publication (Kokai) No. Sho 50-3998 (Jan. 1975).

*Primary Examiner*—David Brunsman
*Attorney, Agent, or Firm*—Sprung Horn Kramer & Woods

[57] ABSTRACT

A process for the production of storable, free-flowing hydrated ferrous sulfate which comprises mixing moist ferrous sulfate heptahydrate and dried hydrated ferrous sulfate in such a ratio that a free-flowing and storable product is obtained.

8 Claims, No Drawings

PROCESS FOR THE PRODUCTION OF STORABLE, FREE-FLOWING HYDRATED FERROUS SULFATE

This application is a continuation, of application Ser. No. 644,791, filed Jan. 23, 1991 now abandoned.

This invention relates to a process for the production of storable, free-flowing hydrated ferrous sulfate by mixing moist ferrous sulfate heptahydrate with dried hydrated ferrous sulfate in the absence of additives.

The spin-dry ferrous sulfate heptahydrate (ratio by weight of ferrous sulfate to water approximately 1.0) obtained in the production of titanium dioxide by the sulfate process is used as a precipitant and flocculant in sewage treatment plants or as a raw material in the production of iron oxide pigments.

However, the hygroscopic properties of spin-dried ferrous sulfate heptahydrate make it difficult to store, transport and handle because it partly oxidizes and forms a tacky, viscous brown mass. If, by contrast, moist ferrous sulfate heptahydrate is dried to a ratio by weight of ferrous sulfate to water of approximately 1.5, as is typically the case in known drying processes, the considerable dust emission causes handling problems.

It is known that the use of neutralizing agents or water binding agents leads to an increase in storage life and to an improvement in flow behavior. Thus, U.S. Pat. No. 2,771,342 describes the drying of moist ferrous sulfate heptahydrate to a ratio by weight of ferrous sulfate to water of 1.27 to 1.50. After the addition of finely ground calcium carbonate and intensive mixing, a free-flowing product with no tendency to agglomerate is obtained, retaining its properties even after storage for 4 weeks at 24° C. (75° F.).

The disadvantage of this product lies in the addition of calcium carbonate as a foreign component. Another disadvantage is that the total quantity of green salt has to be mixed with the calcium carbonate and dried. This involves high energy consumption.

EP-A 321 747 describes the production and use of granulated ferrous sulfate heptahydrate mixed with coke. The mixing of moist ferrous sulfate heptahydrate with lignite dust in a ratio of 3:1 gives a free-flowing, storable mixture of the two substances.

The disadvantage of this product lies in the addition of coke. This confines the use of the product to the treatment of sewage, the sewage sludge obtained having to be burnt in an incinerator.

Accordingly, the problem addressed by the invention was to provide a process which did not have any of the disadvantages mentioned above.

This problem has now been solved by the process according to the invention.

The present invention relates to a process for the production of storable, free-flowing hydrated ferrous sulfate which is characterized in that moist ferrous sulfate heptahydrate and dried hydrated ferrous sulfate are mixed in such a ratio that a free-flowing and storable product is obtained.

The ferrous sulfate heptahydrate obtained as by-product in the production of titanium dioxide is preferably used as the moist ferrous sulfate heptahydrate.

The green salt preferably has a ratio by weight of ferrous sulfate to water of 0.92 to 1.09.

The dried hydrated ferrous fulfate preferably has a ratio by weight of ferrous sulfate to water of 1.38 to 1.71.

In a particularly preferred embodiment, the dried hydrated ferrous sulfate is obtained by drying of moist ferrous sulfate heptahydrate at 40° to 60° C.

The moist ferrous sulfate heptahydrate and the dried hydrated ferrous sulfate are mixed by intensive stirring.

In another preferred embodiment, moist ferrous sulfate heptahydrate having a ratio by weight of iron sulfate to water of 1.09 to 0.92 is mixed with dried hydrated ferrous sulfate having a ratio by weight of ferrous sulfate to water of 1.38 to 1.71 in a ratio of 3:1 to 1:2.

The free-flowing and storable hydrated ferrous sulfate preferably has a ratio by weight of ferrous sulfate to water of 1.17 to 1.50.

The free-flowing, storable hydrated ferrous sulfate produced by the process according to the invention is used as a precipitant and flocculant in sewage treatment plants or as a raw material in the production of iron oxide pigments.

The process according to the invention affords the following advantages:

By comparison with dried hydrated ferrous sulfate, the mixtures according to the invention show considerably less dust emission which makes them much easier to handle.

By comparison with moist ferrous sulfate, flow behavior is favorably influenced (no deterioration is observed, even after storage for several weeks).

The partial oxidation to iron(III) compounds is not accompanied by agglutination of the substance. Where the substance is stored in casks, oxidation is negligible.

The process is energy-saving by comparison with drying of the total quantity of (moist) ferrous sulfate heptahydrate.

No troublesome neutralizing or drying agents are added to the ferrous sulfate heptahydrate; the potential applications of the hydrated ferrous sulfate produced by the process according to the invention are thus not unnecessarily restricted.

The invention is illustrated by the following Example.

EXAMPLE

2 Parts by weight moist ferrous sulfate heptahydrate (ratio by weight of iron sulfate to water 1.04) are intensively mixed with 1 part by weight dried hydrated ferrous sulfate (ratio by weight of iron sulfate to water 1.44). The resulting product shows considerably better flow behavior than the undried sample. The dust emission of the dried sample can be reduced by around 50%. Even after storage for two weeks in high relative air humidity, there is no significant change for the worse either in flow behavior or in dust emission.

By way of comparison, moist ferrous sulfate heptahydrate is present as a non-free-flowing, moist crystal mass. In addition, after storage for two weeks under the same conditions as above, the crystal mass has agglutinated to form a brown, sticky crystal sludge.

It will be appreciated that the instant specification is set forth by way of illustration and not limitation, and that various modifications and changes may be made without departing from the spirit and scope of the present invention.

What is claimed is:

1. A process for the storage of free-flowing iron sulfate green salt which consists essentially of mixing moist green salt having a ratio by weight of iron sulfate to water of 0.92 to 1.09 and dried green salt having a ratio by weight of iron sulfate to water of 1.38 to 1.71 in such a ratio that a free-flowing and storable product is obtained and, without further drying after mixing, storing the mixture.

2. A process as claimed in claim 1, wherein the moist green salt comprises the green salt obtained as a by-product in the production of titanium dioxide.

3. A process as claimed in claim 1, wherein the dried green salt is obtained by drying of moist green salt at 40° to 60° C.

4. A process as claimed in claim 1, wherein the moist green salt is mixed with the dried green salt with intensive stirring.

5. A process as claimed in claim 1, which comprises mixing moist green salt having a ratio by weight of iron sulfate to water of 1.09 to 0.92 with dried green salt having a ratio by weight of iron sulfate to water of 1.38 to 1.71, the ratio of moist green salt to dried green salt ranging from 3:1 to 1:2.

6. A process as claimed in claim 1, wherein the free-flowing and storable green salt has a ratio by weight of iron sulfate to water of 1.17 to 1.50.

7. A process according to claim 1 wherein no neutralizing or drying agents are added to the moist green salt or to the dried green salt.

8. Free-flowing, storable hydrated ferrous sulfate produced by the process of claim 1.

* * * * *